United States Patent
Korth (10) Patent No.: US 10,173,632 B2
(45) Date of Patent: Jan. 8, 2019

(54) AIRBAG UNIT

(71) Applicant: TAKATA AG, Aschaffenburg (DE)

(72) Inventor: Mirko Korth, Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 0 days.

(21) Appl. No.: 15/548,790

(22) PCT Filed: Feb. 4, 2016

(86) PCT No.: PCT/EP2016/052344
§ 371 (c)(1),
(2) Date: Aug. 4, 2017

(87) PCT Pub. No.: WO2016/124669
PCT Pub. Date: Aug. 11, 2016

(65) Prior Publication Data
US 2018/0022306 A1   Jan. 25, 2018

(30) Foreign Application Priority Data

Feb. 5, 2015   (DE) .................. 10 2015 202 045

(51) Int. Cl.
*B60R 21/239*   (2006.01)
*B60R 21/215*   (2011.01)
(Continued)

(52) U.S. Cl.
CPC .......... *B60R 21/239* (2013.01); *B60R 21/215* (2013.01); *B60R 21/2338* (2013.01);
(Continued)

(58) Field of Classification Search
CPC ..... B60R 21/239; B60R 21/215; B60R 21/26; B60R 2021/2395
See application file for complete search history.

(56) References Cited

U.S. PATENT DOCUMENTS 5,536,038 A * 7/1996 Bollaert .................. B60R 21/23
280/730.2
6,017,058 A   1/2000 Ross
(Continued)

FOREIGN PATENT DOCUMENTS

DE   298 02 436 U1   5/1998
DE   103 32 549 A1   3/2004
(Continued)

OTHER PUBLICATIONS

International Search Report dated May 20, 2016 issued in PCT/EP2016/052344.
(Continued)

*Primary Examiner* — Faye M Fleming
(74) *Attorney, Agent, or Firm* — Gordon Rees Scully Mansukhani, LLP (57) ABSTRACT

An airbag unit comprising an airbag which is fillable with a gas in order to protect a vehicle occupant is provided. The airbag comprises two material layers which are connected to each other at their circumferential edge by means of a connection, wherein the connection is interrupted at least in one portion, in order to form an outflow opening, via which gas can escape from the airbag during the filling and/or after the filling, at least one covering device for covering the outflow opening, wherein the covering device comprises at least one closure element which is arranged moveably in relation to the outflow opening in order to vary the size of the outflow opening, and a control unit which is designed to move the at least one closure element in relation to the outflow opening in such a manner that the outflow opening is opened up, covered or partially covered.

17 Claims, 8 Drawing Sheets

(51) Int. Cl.
*B60R 21/2338* (2011.01)
*B60R 21/26* (2011.01)

(52) U.S. Cl.
CPC ...... *B60R 21/26* (2013.01); *B60R 2021/2395* (2013.01); *B60R 2021/23382* (2013.01)

(56) References Cited

U.S. PATENT DOCUMENTS

| | | | |
|---|---|---|---|
| 6,139,048 | A | 10/2000 | Braunschädel |
| 6,811,183 | B1 | 11/2004 | Serban et al. |
| 6,832,778 | B2 | 12/2004 | Pinsenschaum et al. |
| 7,017,945 | B2 | 3/2006 | DePottey et al. |
| 9,834,168 | B2 * | 12/2017 | Deng .................. B60R 21/239 |
| 10,035,487 | B2 * | 7/2018 | Deng .................. B60R 21/239 |
| 2004/0017069 | A1 | 1/2004 | Fischer |
| 2006/0273561 | A1 | 12/2006 | Britz |
| 2007/0040366 | A1 | 2/2007 | Maidel et al. |
| 2007/0187936 | A1 | 8/2007 | Britz |
| 2009/0224520 | A1 * | 9/2009 | Higuchi .............. B60R 21/239 |
| | | | 280/740 |
| 2012/0001408 | A1 | 1/2012 | Mendez |
| 2012/0306187 | A1 | 12/2012 | Mendez et al. |

FOREIGN PATENT DOCUMENTS

| | | |
|---|---|---|
| DE | 20 2005 008 937 U9 | 2/2006 |
| DE | 10 2004 058 440 A1 | 6/2006 |
| DE | 10 2005 027 310 A1 | 12/2006 |
| DE | 10 2007 006 805 A1 | 8/2007 |
| DE | 10 2008 046 265 A1 | 4/2010 |
| DE | 10 2005 039 418 B4 | 6/2012 |
| EP | 0 728 629 B1 | 10/2001 |
| EP | 0 917 994 B1 | 4/2003 |
| EP | 1 214 228 B1 | 5/2004 |
| EP | 2 752 337 A1 | 7/2014 |
| GB | 2 405 250 A | 2/2005 |
| WO | WO 03/006276 A2 | 1/2003 |
| WO | WO 2014/090951 A1 | 6/2014 |

OTHER PUBLICATIONS

German Examination Report dated Sep. 25, 2018 cited in corresponding German patent application.

* cited by examiner

AIRBAG UNIT

CROSS-REFERENCE TO A RELATED APPLICATION

This application is a National Phase patent application of International Patent Application Number PCT/EP2016/052344, filed on Feb. 4, 2016, which claims priority of German Patent Application Number 10 2015 202 045.2, filed on Feb. 5, 2015.

BACKGROUND

The invention relates to an airbag unit.

An airbag unit comprises an airbag which is fillable with a gas in order to protect a vehicle occupant. Gas can escape from the airbag by means of outflow openings, and therefore the pressure in the airbag interior can be adapted to certain load situations. In the prior art, use is made of the fact that outflow openings can expand depending on the pressure conditions in the airbag interior, and therefore gas can escape and the pressure can drop.

SUMMARY

Taking this as the starting point, the present invention is based on the object of specifying an airbag unit comprising an airbag with an outflow opening, the size of which can also be controlled independently of the pressure conditions in the airbag interior.

This object is achieved according to the invention by an airbag unit with features as described herein.

According thereto, the airbag unit has an airbag with two material layers which are connected to each other at their circumferential edge by means of a connection. The connection is interrupted at least in one portion, in order to form an outflow opening, via which gas can escape from the airbag during filling and/or after filling. A covering device is provided for covering the outflow opening, wherein the covering device comprises at least one closure element which is arranged moveably with respect to the outflow opening in order to vary the size of the outflow opening. The at least one closure element is moveable in relation to the outflow opening by means of a control unit.

The control unit can operate without the use of pyrotechnics. For example, the control unit can be purely electronic.

The airbag unit is distinguished in that the control unit is designed to move the at least one closure element in relation to the outflow opening in such a manner that the outflow opening is opened up, covered or partially covered.

According to an embodiment, the control unit can move the at least one closure element in relation to the outflow opening taking into account relevant parameters of the vehicle occupant. Since said parameters can already be determined and can be known before an accident, the control unit can be triggered in particular independently of a gas generator which is triggerable in order to fill the airbag with gas. Accordingly, the control unit can be triggered, for example, before the gas generator is triggered. By this means, delays in the adjustment of the size of the outflow opening can be avoided. In the case of a rapid reaction time of the control unit, the control unit can also be triggered together with the gas generator without the delays mentioned occurring. For triggering together with the gas generator, in addition to parameters of the vehicle occupant, use can also be made of accident-specific information for adjusting the size of the outflow opening. In order to continue to vary the outflow opening, for example during the individual accident phases, the control unit can also still be triggered after the gas generator is triggered.

The connection can comprise at least two connecting elements which each separately hold together the two material layers of the airbag, wherein the at least two connecting elements are arranged with respect to each other in such a manner that they bound a channel in which the at least one closure element is moveably arranged. The at least one closure element is preferably moveable along its direction of extent.

According to a further embodiment, an additional material layer can be arranged on each material layer in the region of the circumferential edge of the material layers, and therefore, in the region of the circumferential edge, two inner material layers are surrounded by two outer material layers. The connection here can firstly hold the two inner material layers together and secondly can hold together the two inner material layers together with the two outer material layers, and therefore a channel is formed between each inner material layer and the respectively adjacent outer material layer. At least one closure element can be arranged moveably in each of said two channels.

The closure element can be designed as a stiff rod-shaped body. In the present case, a stiff rod-shaped body is a body which is only insignificantly formed, if at all, if a pushing force acts on one of its ends and the body is moved along its direction of extent by pushing. The stiff rod-shaped closure element can hold the two inner material layers with respect to each other in the region of the outflow opening in such a manner that they substantially lie against each other.

According to an embodiment, a row of holes or a plurality of rows of holes can be provided in each material layer along the connection. The holes of a row of the one material layer are preferably congruent with the holes of a row of the other material layer. The closure element provided can be a flexible thread-like body which winds in a meandering manner through the holes and holds together the material layers as an addition to the connection. In the present case, a flexible thread-like body is a body which can be deformed in such a manner that it can be threaded through the row of holes. More than one such closure element can also extend through a row of holes. If a plurality of closure elements are provided, the latter can be arranged with phase displacement with respect to one another.

For the covering of the outflow opening, use can also be made of a covering device which firstly has at least one stiff rod-shaped closure element and in addition at least one flexible thread-like closure element and the previously described corresponding receptacles (channels or holes) for said closure elements. In this connection, as viewed in the direction of extent of the closure elements, the stiff rod-shaped closure element and the flexible thread-like closure element can extend next to each other, and therefore said closure elements, for example, together cover an outflow opening. In this connection, there is now a great deal of scope as to the extent to which the outflow opening is opened up by movement of the closure elements since the individual closure elements can be controlled separately from one another.

In a preferred variant, the closure element designed as a stiff rod-shaped body can be arranged closer to an airbag chamber formed by the material layers than the closure element designed as a flexible thread-like body.

A second aspect of the invention indicates an airbag unit, in which the outflow opening is formed in a material layer forming the airbag chamber. For the covering of said outflow opening, use is made of a covering device which comprises a flat covering element which is secured on the material layer in such a manner that said covering element can cover the outflow opening. The covering element here can preferably completely cover the outflow opening. Alternatively, however, said covering element can also only partially cover the outflow opening. At least one holding device is provided on the covering element. The covering device comprises at least one closure element which can be in engagement with the holding device in order to cover the outflow opening. Furthermore, the at least one closure element is held moveably on the material layer by means of a guide device. The at least one closure element can be moved in relation to the outflow opening by means of a control unit, and therefore the at least one closure element is disengaged from the holding device such that the covering element is no longer blocked and the covering element can open up the outflow opening.

The guide device can be designed in the form of a pocket which is arranged on the material layer. Alternatively, the guide device can be formed between the material layer in which the outflow opening is formed and a further material layer forming the airbag chamber.

The holding device can be designed in particular in the form of a tab or a row of tabs, into which the at least one closure element (partially) projects in order to cover the outflow opening. In order to open up the outflow opening the at least one closure element can be (partially) moved out of the tab or the row of tabs by means of the control unit.

The airbag unit is distinguished in that the covering device comprises two covering elements, which can each cover part of the outflow opening, and at least two closure elements, wherein each closure element can be in engagement with a holding device of one of the covering elements.

According to a variant, more than two covering elements can also be provided which each cover part of the outflow opening, and therefore, for example, overall the entire outflow opening is completely covered. For each covering element, at least one corresponding closure element can then be provided, wherein each closure element can be in engagement with a holding device of one of the covering elements.

If the holding device is designed in the form of a tab, in particular each closure element can be arranged moveably in a tab of one of the covering elements.

BRIEF DESCRIPTION OF THE DRAWINGS

The invention is explained in more detail below using a plurality of exemplary embodiments with reference to the figures of the drawing.

FIG. 4b shows a sectional view of a variant of the airbag from FIG. 4a.

FIG. 5b shows a perspective illustration of the airbag from FIG. 5a.

FIG. 6a shows a sectional view of a variant of the airbag from FIG. 5a.

FIG. 6b shows a perspective illustration of the airbag from FIG. 6a.

DETAILED DESCRIPTION

Figure 1:
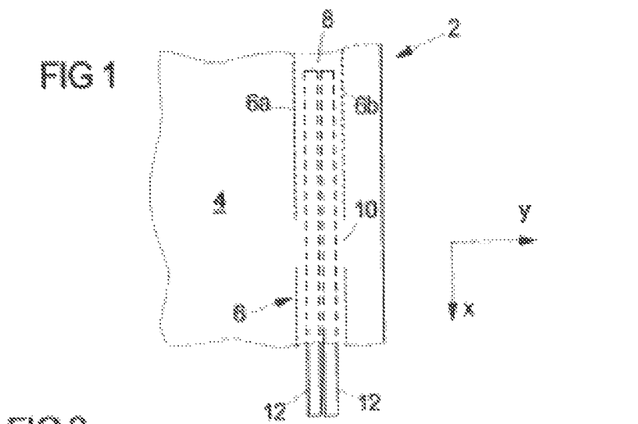
FIG. 1 shows a top view of an airbag with a covering device for an outflow opening between the circumferential edges of two material layers of the airbag according to one embodiment.
Figure 2:
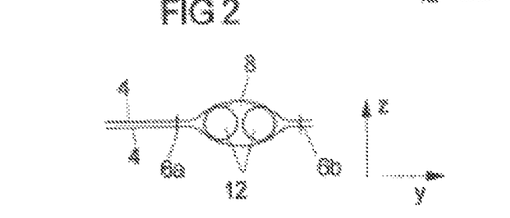
FIG. 2 shows a sectional view of the airbag from FIG. 1.
Figure 3:
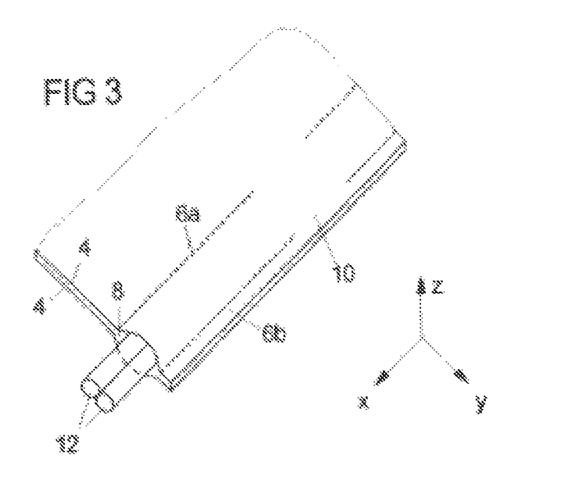
FIG. 3 shows a perspective illustration of the airbag from FIG. 1.

FIGS. 1 to 3 illustrate an airbag 2 with a covering device according to a first embodiment. The airbag 2 comprises two material layers 4 which are connected to each other in the region of their circumferential edge by means of a connection 6. The material layers 4 enclose an airbag interior and can be arranged flat in an x, y, plane. The connection 6 holds the material layers together in the z direction. The material layers 4 surround an airbag interior which can be filled by means of a gas generator (not illustrated) with a gas in order to protect a vehicle occupant.

The connection 6 comprises two connecting elements 6a, 6b which are each designed in the form of a seam. Alternatively, the connecting elements 6a, 6b can also be adhesive elements. The two seams 6a, 6b extend substantially parallel to each other and at a distance from the circumferential edges of the material layers 4. Each seam 6a, 6b separately holds the two material layers 4 together. In the space between the two seams 6a, 6b, the two material layers 4 therefore bound a channel 8 which extends along the circumferential edges of the material layers 4.

So that gas can escape from an airbag 2 filled with gas if the need arises, the connection 6 is interrupted in a portion, and therefore seams which connect the two material layers 4 to each other are not present in said portion. The interruption to the connection 6 results in this portion in an outflow opening 10, via which gas can escape from the filled airbag 2. Alternatively, the connection 6 can be interrupted in a plurality of portions, and therefore the airbag 2 can have a plurality of outflow openings 10.

So that the gas can escape from the airbag only if the need arises, a covering device is provided for covering the outflow opening 10, said covering device being able to open up the outflow opening 10 if the need arises. For this purpose, the covering device comprises two closure elements 12. Alternatively, only one closure element 12 or more than two closure elements 12 can also be provided, depending on the desired sealing effect. The closure elements 12 are designed as stiff rod-shaped bodies. In the embodiment illustrated in FIGS. 2 and 3, the closure elements 12 are two separate rods with a circular cross section. Alternatively, the cross section can also have a different shape. Furthermore, the rods can be connected to each other at one of their ends. This can be achieved, for example, by bending an individual closure element 12. The closure elements 12 are arranged moveably along their direction of extent in the channel 8.

In a covered state of the outflow opening 10, the closure elements 12 are arranged in the channel 8 in such a manner that, as illustrated in FIG. 1, they extend beyond the outflow opening 10 and therefore cover the outflow opening 10 in the y direction. Since the stiff closure elements 12 predefine the shape of the airbag 2 in the region of the circumferential edges of the material layers 4, they furthermore keep the material layers 4 close to each other in the z direction in the region of the outflow opening 10, and therefore, in the covered state, the outflow opening 10 is also as small as possible in the z direction and the two material layers 4 substantially lie against each other (FIG. 2).

In an uncovered state of the outflow opening 10, the closure elements 12 are arranged in the channel 8 in such a manner that they do not extend beyond the outflow opening 10 and therefore open up the outflow opening 10 in the y direction. Since the stiff closure elements 12 project less deeply into the channel 8 in the uncovered state in comparison to the covered state and in particular open up the outflow opening 10, the airbag 2 is more easily deformable in the region of the outflow opening 10. The distance between the material layers 4 can therefore increase in the z direction in the region of the outflow opening 10 (because of the gas pressure in the airbag interior) and gas can escape from the airbag interior via the outflow opening 10.

In an intermediate state, the closure elements 12 are arranged in the channel 8 in such a manner that they partially extend beyond the outflow opening 10 and therefore only partly cover the outflow opening 10 in the y direction.

In the embodiment of FIGS. 1 to 3, the shape and size of the cross section of each closure element 12 are substantially constant over its entire length.

However, according to an alternative, the shape and/or the size of the cross section of each closure element 12 can change over the length thereof. For example, the size of the cross section can change with the shape remaining the same. In the covered state, that portion of the closure element 12 with the larger (largest) cross section then extends beyond the outflow opening 10. In the uncovered state, that portion of the closure element 12 with the smaller (smallest) cross section then extends beyond the outflow opening 10.

The closure elements 12 are arranged moveably along their direction of extent in the channel 8. A control unit (not illustrated) is provided in order to move the closure elements 12 along their direction of extent in the channel 8, and therefore the covered state, the uncovered state or the intermediate state can be set.

In particular, the control unit is designed to control the movement of the closure elements 12 depending on parameters related to the vehicle occupant, and therefore the size of the outflow opening 10 does not depend on the stretching of the airbag 2 but primarily on features of the vehicle occupant such as, for example, the body weight thereof. The control unit is triggerable independently of the gas generator which is triggered only as a consequence of an impact. The control unit can thus move the closure elements 12, for example even before an accident, for example as soon as a vehicle seat is occupied, and can adapt the size of the outflow opening 10 to the vehicle occupant (pre-crash triggered state). In the case of a plurality of outflow openings 10, the control unit can move the closure elements 12 in such a manner that a number of outflow openings 10 adapted to the vehicle occupant is exposed. Should an accident not have occurred, the control unit can move the closure elements 12 into their starting position again, for example as soon as the vehicle occupant leaves the vehicle seat. On account of the rigidity of the closure elements 12, the movement of the closure elements 12 cannot only be a pulling movement but also a pushing movement, and therefore the movement of the closure elements 12 is reversible again within the scope of a pre-crash triggered state.

Alternatively, the control unit can be triggered again only when the gas generator is triggered or after the gas generator has been triggered (in-crash triggered state). In the case of the in-crash triggered state, in addition to features of the vehicle occupant, information regarding the type and the severity of the impact can also be used by the control unit for controlling the movement of the closure elements 12. Furthermore, the control unit can be configured to move the closure elements 12 during an accident in a manner corresponding to the phase of the accident and therefore to vary the size of the outflow opening 10 over the course of the accident.

Figure 4A:
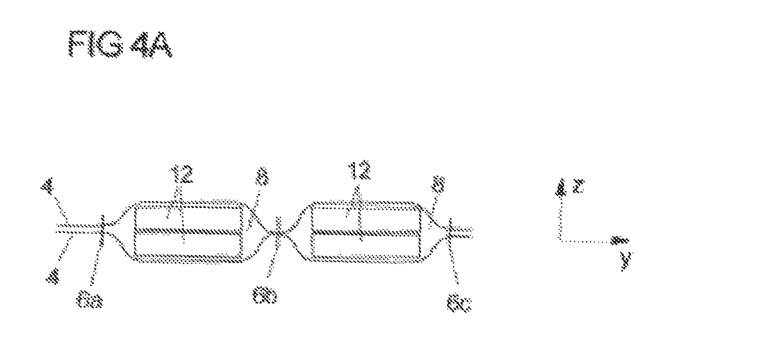
FIG. 4a shows a sectional view of an airbag with a covering device for an outflow opening between the circumferential edges of two material layers according to a further embodiment.

FIG. 4a illustrates an airbag 2 with a covering device according to a second embodiment. The second embodiment differs from the first embodiment in that the connection 6 does not have two, but rather three connecting elements 6a, 6b, 6c. The connecting elements 6a, 6b, 6c are designed in the form of three seams which extend substantially parallel to one another and at a distance from the circumferential edges of the material layers 4. Each seam 6a, 6b, 6c separately keeps the two material layers 4 together. In the space between the seams 6a, 6b and between the seams 6b, 6c, the two material layers 4 therefore each bound a channel 8. The two channels 8 extend substantially parallel to each other along the circumferential edges of the material layers 4. In the embodiment illustrated in FIG. 4a, two closure elements 12 with a rectangular cross section are arranged moveably in each channel 8. However, the number and cross section of the closure elements 12 are selectable depending on the desired sealing effect. For example, one closure element 12 can be provided per channel 8.

The sealing effect of the covering device is adjustable by the number of channels 8 arranged next to one another in the y direction. By way of example, FIG. 4a illustrates an embodiment with two channels 8. Alternatively, the number of channels 8 can be correspondingly increased.

FIGS. 5a, 5b, 6a and 6b illustrate an airbag 2 with a covering device according to a third embodiment. The third embodiment differs from the first embodiment in that two additional material layers 14 are provided in the region of the circumferential edge of the material layers 4. The additional material layers 14 are separate elements and are of substantially strip-shaped design. The two additional material layers 14 are arranged as inner material layers between the material layers 4 (outer material layers) in the region of the circumferential edges thereof. Accordingly, four layers 4, 14 are arranged one above another in the z direction in the region of the circumferential edge of the airbag 2.

The two connecting elements 6a, 6b each separately hold together the four layers 4, 14. In the space between the seams 6a, 6b, the layers 4, 14 therefore bound a total of three channels 8a, 8b which are arranged one above another in the z direction. One of the three channels 8a is bounded by the additional (inner) material layers 14. The other two channels 8b are adjacent to the channel 8a and each share an additional (inner) material layer 14 therewith. The two channels 8b are each bounded by an inner material layer 14 and an outer material layer 4.

Figure 5A:
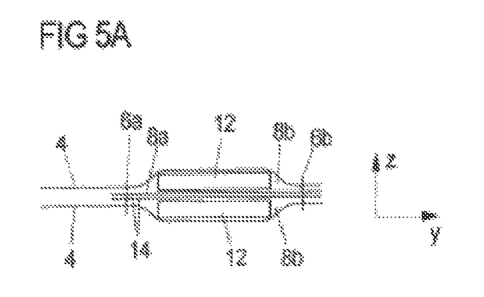
FIG. 5a shows a sectional view of an airbag with a covering device for an outflow opening between the circumferential edges of two material layers according to a further embodiment.
Figure 5B:
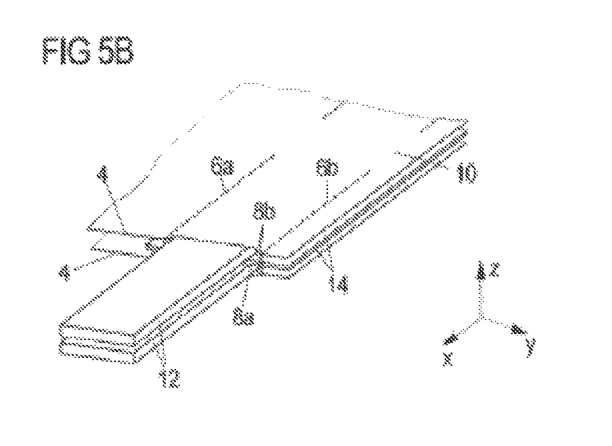

In the channels 8b, a respective closure element 12 is arranged displaceably along its direction of extent. In FIGS. 5a and 5b, the closure elements 12 each have a rectangular cross section. However, the cross-sectional shapes and the number of closure elements 12 are selectable depending on the desired sealing effect. Thus, as illustrated, for example, in FIGS. 6a and 6b, the cross section of the closure elements 12 can be round.

According to FIGS. 5a, 5b, 6a and 6b, no closure element is provided in the channel 8a which is bounded by the inner material layers 14. However, according to an alternative refinement this is entirely possible depending on the desired sealing effect.

According to a further alternative, the two material layers 4 which bound the airbag interior can be arranged as inner material layers between the additional material layers 14 (outer material layers) in the region of the circumferential edges thereof.

The additional material layers 14 can be provided as described, as separate elements. Alternatively, the additional material layers 14 can be formed by folding of the material layers 4 in the region of the circumferential edge thereof, and therefore, for each material layer 4, the channel 8b is produced in each case in the form of a loop (not illustrated). In each case one closure element 12 (or a plurality of closure elements 12) is or are arranged displaceably in the channels 8b.

Figure 6A:
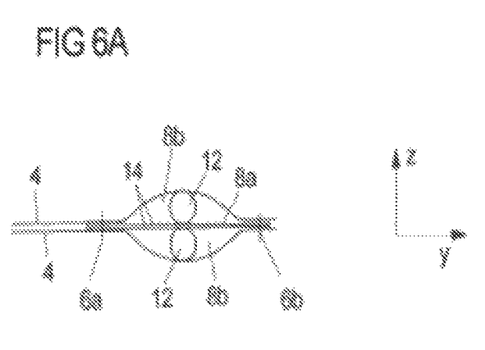
Figure 6B:
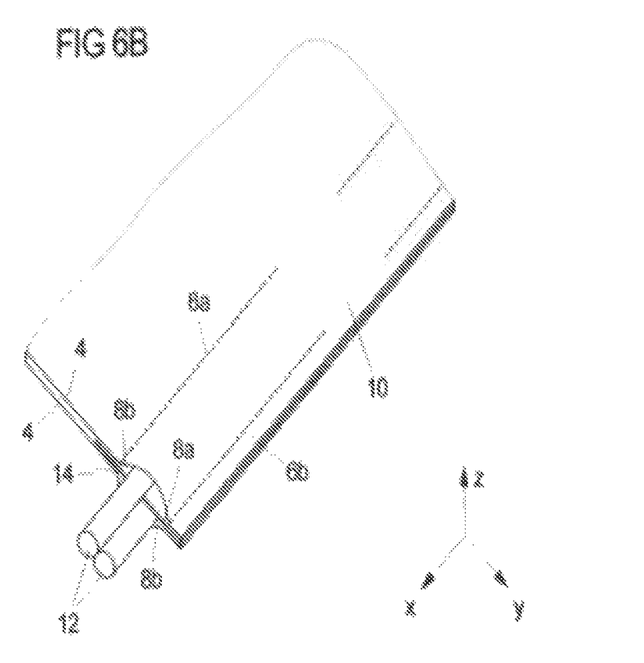

In a covered state of the outflow opening 10, the closure elements 12 are arranged in the channels 8b in such a manner that they extend beyond the outflow opening 10 and therefore cover the outflow opening 10 in the y direction. The stiff closure elements 12 here predefine the shape of the additional (or inner) material layers 14 in the region of the outflow opening, and therefore, in the covered state, the additional (or inner) material layers 14 lie substantially against one another and the outflow opening 10 is also as small as possible in the z direction (FIGS. 5a and 6a).

In an uncovered state of the outflow opening 10, the closure elements 12 are arranged in the channels 8b in such a manner that they do not extend beyond the outflow opening 10 and therefore open up the outflow opening 10 in the y direction. Since, in the uncovered state, the stiff closure elements 12 project less deeply into the channels 8b in comparison to the covered state and in particular open up the outflow opening 10, the airbag 2 is more easily deformable in the region of the outflow opening 10. The distance between the material layers 4, and in particular between the additional (inner) material layers 14, can thus increase in the region of the outflow opening 10 (because of the gas pressure in the airbag interior) in the z direction and gas can escape from the airbag interior via the outflow opening 10.

In an intermediate state, the closure elements 12 are arranged in the channels 8b in such a manner that they partially extend beyond the outflow opening 10 and therefore only partially cover the outflow opening 10 in the y direction. Alternatively, the closure element 12 can be arranged in the one channel 8b in such a manner that said closure element extends beyond the outflow opening 10 while the closure element 12 is arranged in the other channel 8b in such a manner that said closure element opens up the outflow opening 10.

Figure 4B:
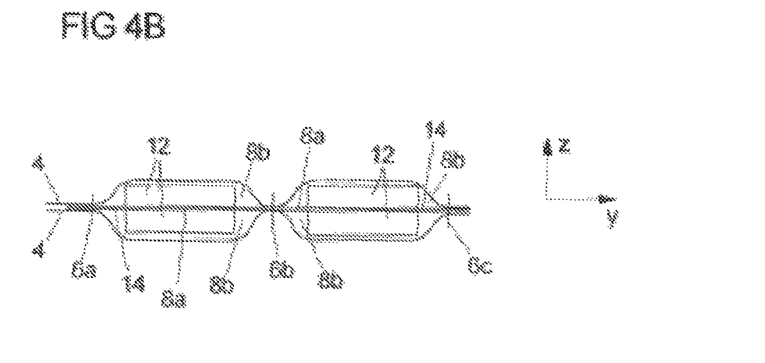

According to a variant, the second embodiment (FIG. 4a) and the third embodiment (FIGS. 5a, 5b, 6a and 6b) can be combined. Accordingly, the connection 6 comprises three connecting elements (seams) 6a, 6b, 6c, wherein in each case two channels 8b and one channel 8a extend between the seams 6a and 6b and between the seams 6b and 6c. The channel 8a is located between the channels 8b, as viewed here in the z direction. An exemplary embodiment is illustrated in FIG. 4b.

In principle, the exemplary embodiments described in the embodiments of FIGS. 1 to 6b should merely be understood as being by way of example with respect to length, number and orientation of the closure elements 12 and can be combined with one another as desired. If a plurality of closure elements 12 are provided, the movement of each individual closure element 12 can basically also be controlled individually by the control unit.

Figure 7:
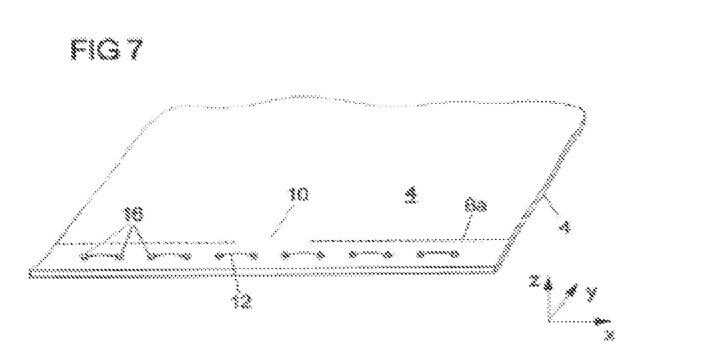
FIG. 7 shows a perspective illustration of an airbag with a covering device for an outflow opening between the circumferential edges of two material layers according to a further embodiment.
Figure 8:
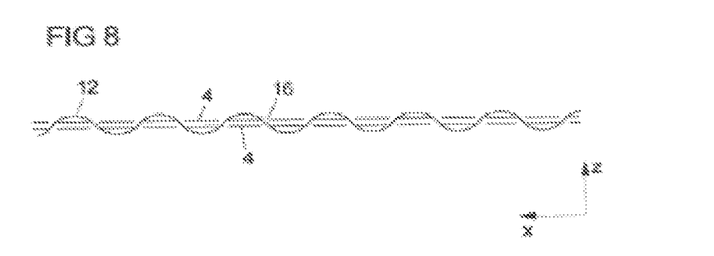
FIG. 8 shows a sectional view of the airbag from FIG. 7.

FIGS. 7 and 8 illustrate an airbag 2 with a covering device according to a fourth embodiment. The fourth embodiment differs from the first embodiment in that the connection 6 does not require two connecting elements, but rather one connecting element 6a is sufficient. Of course, two or more connecting elements can nevertheless be provided.

The connecting element 6a extends substantially parallel at a distance from the circumferential edges of the material layers 4. The connecting element 6a is interrupted in one portion, and therefore the outflow opening 10 via which gas can escape from the filled airbag 2 is formed in said portion. A row of holes 16 is provided in one portion of each material layer 4 between the circumferential edge and the connecting element 6a. The row of holes 16 extends along the connecting element 6a and also in front of the outflow opening 10, i.e. along the portion in which the connecting element 6a is interrupted. The holes 16 are arranged here in the one material layer 4 and in the other material layer 4 in such a manner that they come to lie above one another in the z direction when the material layers 4 are correctly connected by the connecting element 6a.

The closure element 12 is a flexible thread-like body which extends in a meandering manner through the holes 16. The thread 12 here connects the two material layers 4 to each other as an addition to the connecting element 6a. In the covered state, the thread 12 extends in particular through the holes 16 in front of the outflow opening 10, and therefore the thread 12 holds together the material layers 4 in the region of the outflow opening 10 in the z direction (FIG. 7). Depending on requirements, the thread 12 can be pulled out of the holes 16 by means of the control unit, and therefore the thread 12 does not extend through the holes 16 in front of the outflow opening 10 (uncovered state) or extends only through some of said holes (intermediate state) and the outflow opening 10 is enlarged.

The fourth embodiment is suitable in particular for the in-crash triggered state.

According to an alternative of the fourth embodiment (FIG. 9), in addition to the first closure element 12 a second closure element 12 is provided which is likewise designed as a flexible thread-like body. The second thread 12 likewise extends in a meandering manner through the holes 16, but with a phase displacement with respect to the first thread 12. By this means, the sealing effect of the covering element can be increased.

Figure 9:
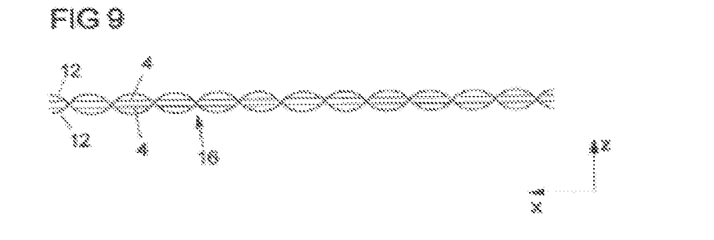
FIG. 9 shows a sectional view of the airbag from FIG. 7 according to one alternative.

According to a further alternative, the first and the second thread 12 are not phase-displaced in relation to each other. A further alternative makes provision for more than one row of holes 16 to be formed in a portion of each material layer 4 between the circumferential edge and the connecting element 6a. The rows each extend along the connecting element 6a and also in front of the outflow opening 10.

Figure 10:
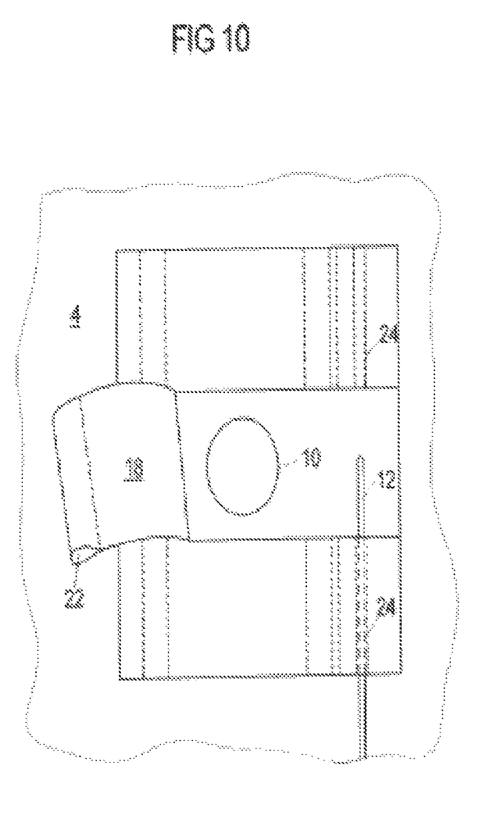
FIG. 10 shows a perspective illustration of an airbag with a covering device for an outflow opening in a material layer of the airbag according to one embodiment, wherein the outflow opening is in an uncovered state.
Figure 11:
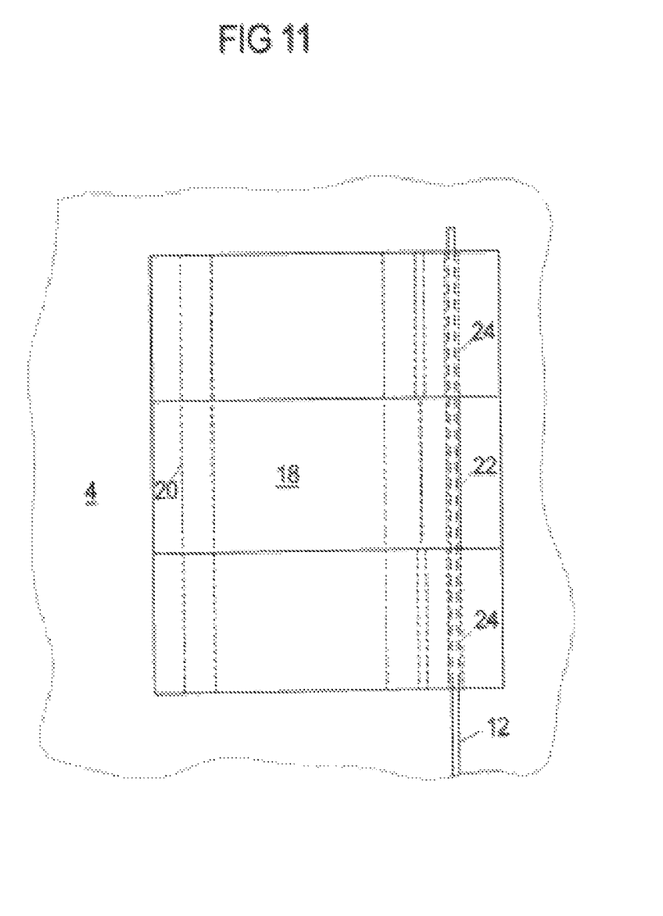
FIG. 11 shows a top view of the airbag from FIG. 10, wherein the outflow opening is in a covered state.

FIGS. 10 and 11 illustrate an airbag 2 with an outflow opening 10, which is formed in a material layer 4 of the airbag 2, and with a covering device for covering the outflow opening 10. The covering device comprises a covering element 18 which is secured on the material layer 4 by a suitable means 20, such as, for example, a seam or an adhesive connection. The covering element 18 is a flat element which, for example, is composed of the same (flexible) material as the material layer 4. The covering element 18 is secured on the material layer 4 in such a manner that said covering element can cover the entire outflow opening 10. The covering element 18 is moveable in relation to the outflow opening 10, and therefore the covering element 18 can completely cover the outflow opening 10 (covered state, FIG. 11) or can open same up (uncovered state, FIG. 10). The covering element 18 comprises at least one holding device 22 which is designed as a tab in order to interact with a closure element 12 in the covered state. The tab 22 serves here in particular for receiving the closure element 12. The tab 22 extends here over the entire width of the covering element 18. The closure element 12 is a stiff rod-shaped body which is fastened moveably on the material layer 4 by means of one or more guide devices 24 designed as pockets and formed on the material layer 4. In particular, in the covered state, the pocket(s) 24 and the tab 22 of the covering element 18 are arranged with respect to one another in such a manner that together they form a channel in which the closure element 12 is moveable along its direction of extent. In the exemplary embodiment of FIGS. 10 and 11, two pockets 24 are provided, one pocket in front of and one pocket behind the covering element 18. Alternatively, in each case more than one pocket 24 can be provided in front of and/or behind the covering element 18. Furthermore, the pockets 24 can also be provided only on one side of the covering element 18, i.e. in front of or behind the covering element 18. The terms in front of and behind relate here to the direction of extent of the closure element 12, along which the closure element 12 is moveable. If the closure element extends through the tab 22 of the covering element 18 and through the pockets 24, the covering element 18 is not moveable in relation to the outflow opening 10 and completely covers the outflow opening 10. The outflow opening 10 is in the covered state. If the covering element 18 has been pulled out of at least one of the pockets 24 and out of the tab 22 of the covering element 18, the covering element 18 is moveable in relation to the outflow opening 10. Gas can flow unobstructed out of the outflow opening 10 and can push the covering element 18 away from the material layer 4. The outflow opening 10 is in the uncovered state. The closure element 12 is moveable in the tab 22 and the pockets 24 by means of a control unit which has already been described for the embodiment of FIGS. 1 to 3. Since the closure element 12 is a stiff body, the covering device is suitable for a pre-crash triggered state and an in-crash triggered state.

Figure 12:
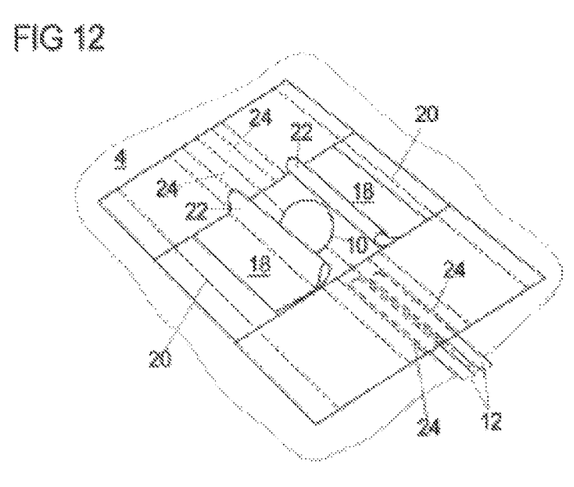
FIG. 12 shows a perspective illustration of an airbag with a covering device for an outflow opening in a material layer of the airbag according to a further embodiment, wherein the outflow opening is in an uncovered state.
Figure 13:
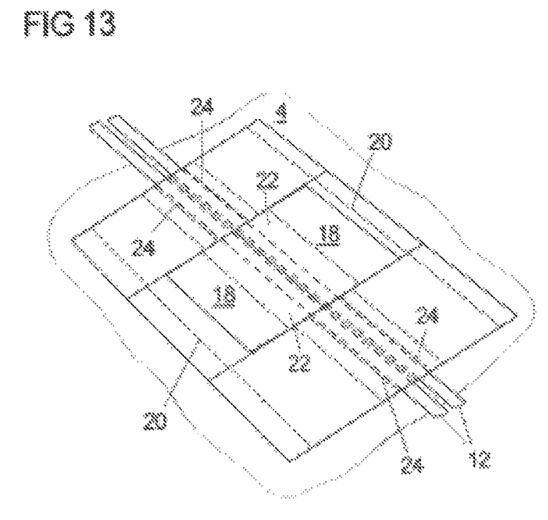
FIG. 13 shows a top view of the airbag from FIG. 12, wherein the outflow opening is in a covered state.

FIGS. 12 and 13 illustrate an airbag 2 with an outflow opening 10 which is formed in a material layer 4 of the airbag 2 and with a covering device for covering the outflow opening 10 according to a further embodiment. This embodiment differs from the embodiment of FIGS. 10 and 11 in that, instead of one covering element 18, two separate covering elements 18 are provided. The two covering elements 18 are each identical in terms of construction to the covering element 18 from FIGS. 20 and 11. However, they are smaller and the two covering elements 18 in the covered state each extend only over part of the outflow opening 10. The two covering elements 18 together extend over the entire outflow opening 10. For this purpose, the covering elements 18 are fastened on two diametrically opposite sides of the outflow opening 10 to the material layer 4 via a means 20, such as, for example, a seam, and extend from there substantially as far as the center of the outflow opening 10 where the two covering elements 18 lie against each other in the covered state (FIG. 13).

Accordingly, for each covering element 18, a closure element 12 is arranged moveably on the tabs 22 and pockets 24 in order to expose or cover the outflow opening 10. Each closure element 12 is moveable independently of the other closure element 12 by the control unit. In this embodiment, in contrast to the embodiment of FIGS. 10 and 11, not only can a covered state (FIG. 13) and an uncovered state (FIG. 12) be set, but also an intermediate state (not illustrated) in which, for example, only one of the two covering elements 18 extends over part of the outflow opening 10. The other part of the outflow opening 10 is accordingly exposed. The outflow opening 10 is therefore not open to the maximum extent.

The invention claimed is:

1. An airbag unit, comprising
an airbag which is fillable with a gas in order to protect a vehicle occupant, wherein the airbag comprises two material layers which are connected to each other at their circumferential edge by means of a connection, wherein the connection is interrupted at least in one portion, forming an outflow opening, via which gas can escape from the airbag during the filling and/or after the filling,
at least one covering device for covering the outflow opening, wherein the covering device comprises at least one closure element which is arranged moveably in relation to the outflow opening in order to vary the size of the outflow opening, and
a control unit which is designed to move the at least one closure element in relation to the outflow opening,
wherein the control unit is designed to move the at least one closure element in relation to the outflow opening in such a manner that the outflow opening is opened up, covered or partially covered.

2. The airbag unit as claimed in claim 1, wherein the control unit can be triggered independently of a gas generator which is triggerable in order to fill the airbag with gas.

3. The airbag unit as claimed in claim 2, wherein the control unit is triggered before the gas generator is triggered.

4. The airbag unit as claimed in claim 2, wherein the control unit is triggered together with or after the gas generator.

5. The airbag unit as claimed in claim 1, wherein the control unit moves the at least one closure element in relation to the outflow opening taking into account relative parameters of the vehicle occupant.

6. The airbag unit as claimed in claim 1, wherein the connection comprises at least two connecting elements which each separately hold together the two material layers of the airbag, wherein the at least two connecting elements are arranged with respect to each other in such a manner that they bound a channel in which the at least one closure element is moveably arranged.

7. The airbag unit as claimed in claim 6, wherein the at least one closure element is a stiff rod-shaped body which holds the two material layers with respect to each other in the region of the outflow opening in such a manner that they substantially lie against each other.

8. The airbag unit as claimed in claim 1, wherein an additional material layer is arranged on each material layer in the region of the circumferential edge of the material layers, and therefore two inner material layers are surrounded by two outer material layers, wherein the connection holds the two inner material layers firstly together and secondly together with the two outer material layers, and therefore a channel is formed between each inner material layer and the respectively adjacent outer material layer, wherein at least one closure element is moveably arranged in each channel.

9. The airbag unit as claimed in claim 8, wherein the at least one closure element is in each case a stiff rod-shaped body which holds the two inner material layers with respect to each other in the region of the outflow opening in such a manner that they substantially lie against each other.

10. The airbag unit as claimed in claim 1, wherein a row of holes is provided in each material layer along the connection.

11. The airbag unit as claimed in claim 10, wherein the holes in the one material layer are congruent with the holes in the other material layer.

12. The airbag unit as claimed in claim 10, wherein the at least one closure element is a flexible thread-like body which extends in a meandering manner through the holes and holds the material layers together as an addition to the connection.

13. The airbag unit as claimed in claim 12, wherein at least one additional closure element is provided which extends in a meandering manner through the holes with phase displacement with respect to the at least one closure element.

14. The airbag unit as claimed in claim 10, wherein a plurality of rows of holes are provided through which in each case at least one closure element extends or at least one closure element and at least one additional closure element extend.

15. An airbag unit with an outflow opening, wherein for the covering of the outflow opening the covering device as claimed in claim 6 is provided, wherein a row of holes is provided in each material layer along the connection.

16. The airbag unit as claimed in claim 15, wherein the closure element designed as a stiff rod-shaped body is arranged closer to an airbag chamber formed by the material layers than the closure element designed as a flexible thread-like body.

17. An airbag unit, comprising
an airbag which is fillable with a gas in order to protect a vehicle occupant, wherein an outflow opening is formed in at least one material layer of the airbag, via which outflow opening gas can escape from the airbag during filling and/or after filling,
a covering device which comprises a flat covering element which is secured to the material layer in such a manner that said covering element can cover the outflow opening, wherein at least one holding device is provided on the covering element, wherein the covering device comprises at least one closure element which can be in engagement with the holding device in order to cover the outflow opening,
a guide device which is designed to hold the at least one closure element moveably on the material layer, and
a control unit which is designed to move the at least one closure element in relation to the outflow opening, and therefore the at least one closure element can be disengaged from the holding device of the covering element and the covering element can open up the outflow opening,
wherein the covering device comprises two covering elements which can each cover part of the outflow opening, and at least two closure elements, wherein each closure element can be in engagement with a holding device of one of the covering elements.

* * * * *